United States Patent [19]

Miller

[11] 3,971,423

[45] July 27, 1976

[54] LOG FEEDER FOR CANTING MACHINE

[75] Inventor: Frederick L. B. Miller, Lake Oswego, Oreg.

[73] Assignee: Mainland Industries, Inc., Lake Oswego, Oreg.

[22] Filed: Feb. 18, 1975

[21] Appl. No.: 550,468

[52] U.S. Cl. .......................... 144/176; 144/242 R; 144/246 C; 144/323; 198/200

[51] Int. Cl.² .................... B27C 1/12; B27B 31/02; B65G 15/42

[58] Field of Search ........... 144/114 R, 116 R, 134, 144/162 R, 172, 176, 242, 253 R, 253 A, 253 C, 246 F, 246 C, 312, 321, 323; 198/131, 200

[56] References Cited

UNITED STATES PATENTS

| | | | |
|---|---|---|---|
| 1,938,108 | 12/1933 | Morris | 144/116 |
| 3,125,141 | 3/1964 | Best et al. | 144/116 X |
| 3,190,326 | 6/1965 | Standal | 144/162 R |
| 3,361,167 | 1/1968 | Farnsworth | 144/176 X |
| 3,552,457 | 1/1971 | Bos | 144/326 R X |
| 3,779,364 | 12/1973 | Kammann | 198/131 |

FOREIGN PATENTS OR APPLICATIONS

| | | | |
|---|---|---|---|
| 825,477 | 3/1938 | France | 144/253 C |

*Primary Examiner*—Al Lawrence Smith
*Assistant Examiner*—Nicholas P. Godici
*Attorney, Agent, or Firm*—Lee R. Schermerhorn

[57] ABSTRACT

The canting machine comprises a pair of log slabbing rotary chipper heads arranged to slab off opposite sides of a log to make a cant which may be subsequently sawed into lumber. The infeed section comprises an endless chain having pairs of saddles spaced different distances apart on the chain to receive logs of different length. One end of the log rests on one saddle and the opposite end rests on the other saddle of the selected pair. In another arrangement, two side-by-side endless chains may be used, one chain carrying a saddle to support the leading end of each log and the other chain carrying a saddle to support the trailing end. A differential drive mechanism for the chains permits adjustment of the spacing of the two saddles to accomodate short and long logs. The outfeed section in either case comprises a pair of guide plates having feed rollers to grip opposite sides of the cant.

10 Claims, 8 Drawing Figures

Fig. 3
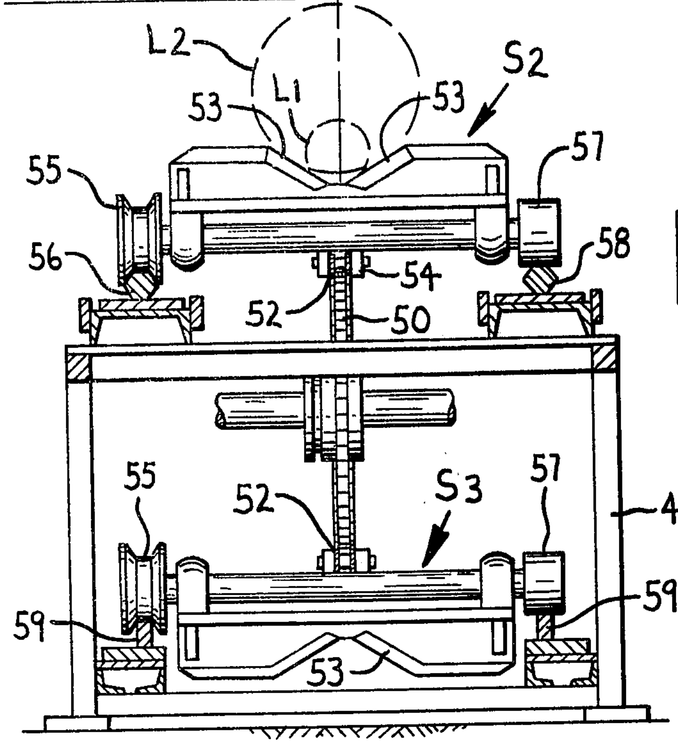
Fig. 6
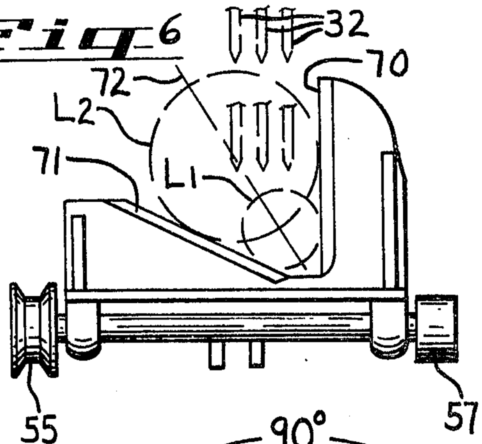
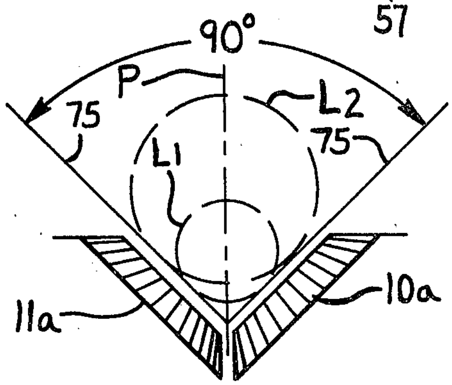
Fig. 7
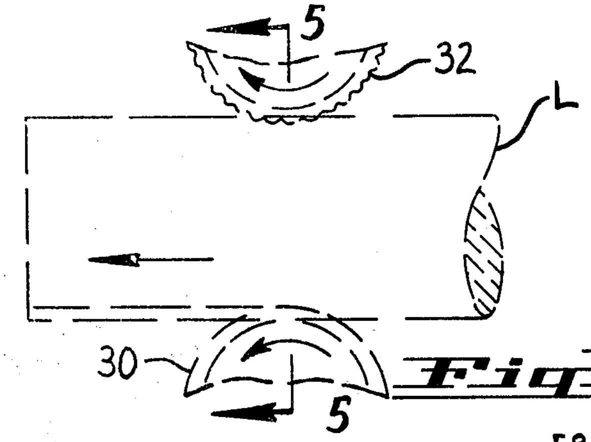
Fig. 4
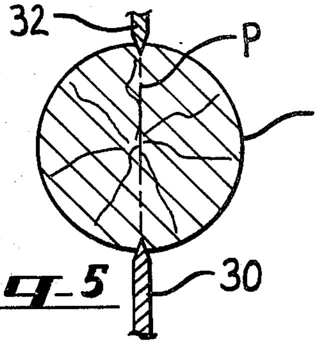
Fig. 5
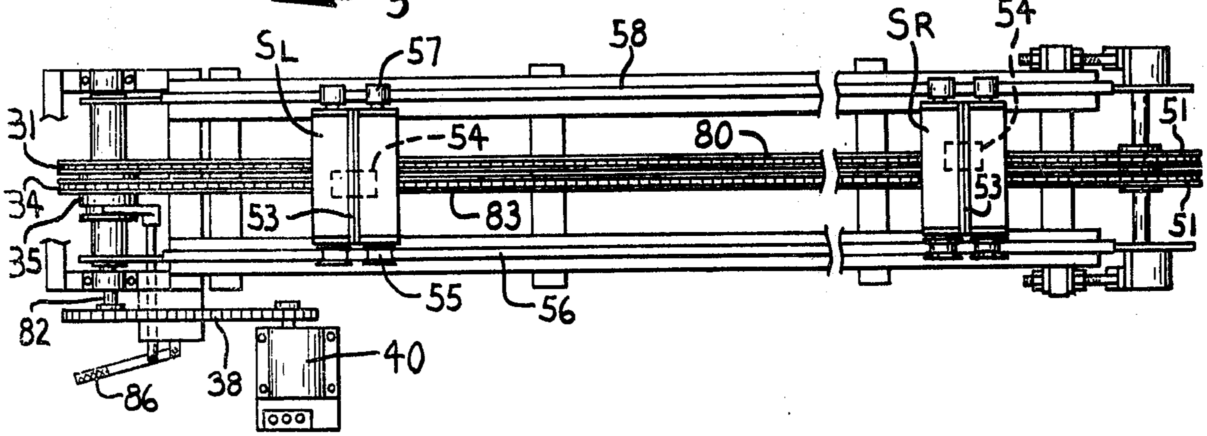
Fig. 8

LOG FEEDER FOR CANTING MACHINE

BACKGROUND OF THE INVENTION

This invention relates to a log feeder for a canting machine.

In the sawing of logs to make lumber the first operation is to slab off opposite sides of a log to make a cant with at least two parallel faces. The cant is then sawed into boards of the desired dimensions. In the past, the slabbing operation was done by saws, the slabs either being burned as waste material or transported to a chipper to make usable chips in a separate operation.

More recently, chippers have been used to perform the slabbing operation, thereby minimizing waste and avoiding handling and transportation of the sawed slabs containing outer portions of the log which are not suitable for lumber. Then, as the supply of relatively straight and true logs became exhausted, difficulties were encountered in feeding logs with irregularities such as knots, flared ends, burls, bends and twists. It is difficult to stabilize such logs in their passage through the chipper.

Various infeed arrangements have been proposed heretofore to overcome these difficulties, such as V-troughs in which feed chains have been mounted, chains having spaced chairs or saddles, paired belts which form the sides of a rectangular trough, conveyer chains similarly arranged with attachments to grip the log, top and bottom chains and rolls having pointed studs. These arrangements however, have not provided an adequate solution to the problem.

Objects of the present invention are, therefore, to provide an improved canting machine, to provide a log slabbing chipper with separate infeed and outfeed means, to provide improved infeed and outfeed means, to provide infeed means which will more satisfactorily stabilize irregular logs, and to provide an infeed mechanism which is readily adjustable to the length of the log for treating logs of different length.

SUMMARY OF THE INVENTION

In the present arrangement the infeed section of the canting machine is separated from the outfeed section. In one embodiment the infeed section comprises an endless chain having pairs of saddles or chairs spaced different distances apart on the chain. The operator selects a pair of saddles which have appropriate spacing for the oncoming log. For maximum stability, one end of the log rests on one saddle and the opposite end rests on the other saddle of the selected pair.

In another embodiment, two side-by-side endless chains are used, one chain carrying a saddle to support the leading end of each log and the other chain carrying a saddle to support the trailing end. A differential drive mechanism permits adjustment of the spacing of the two saddles to accommodate short and long logs.

In both embodiments the outfeed section comprises a pair of guide plates having feed rollers to grip opposite sides of the cant after the chipping operation.

The invention will be better understood and additional objects and advantages will become apparent from the following description of the preferred embodiments illustrated in the accompanying drawings. Various changes may be made, however, in the details of construction and arrangement of parts and certain features may be used without others. All such modifications within the scope of the appended claims are included in the invention.

BRIEF DESCRIPTION OF THE DRAWINGS

FIG. 3 is a view on the line 3—3 in FIG. 1;

FIG. 4 is a fragmentary view of a portion of FIG. 1;

FIG. 5 is a view on the line 5—5 in FIG. 4;

FIG. 6 is a view showing an alternate form of saddle;

FIG. 7 is a view showing an alternate arrangement of the chipper heads; and

FIG. 8 is a top plan view, with parts broken away, showing a different arrangement of the infeed section.

DESCRIPTION OF THE PREFERRED EMBODIMENTS

Figures 1, 2:
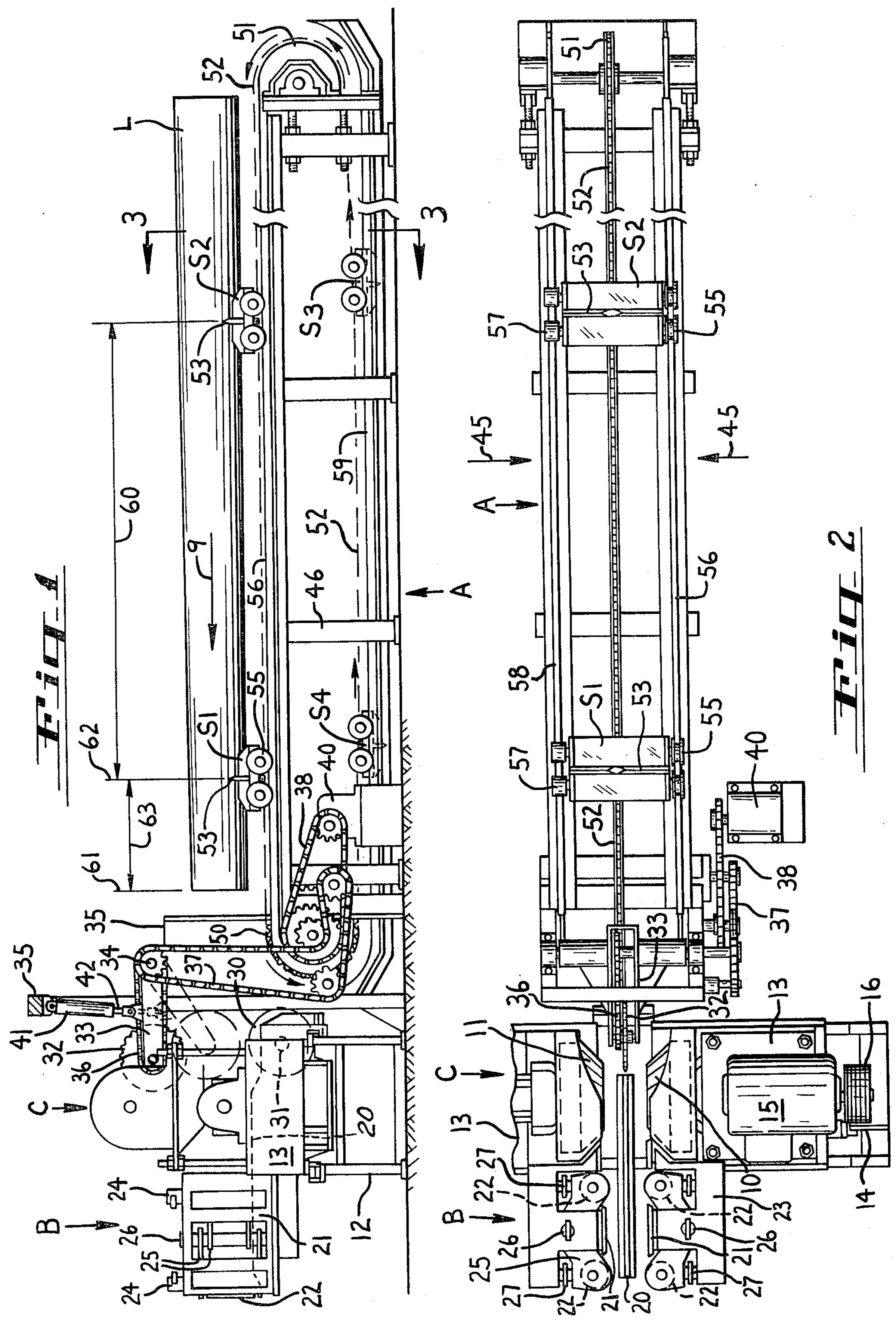
FIG. 1 is a side elevation view of a canting machine, with parts broken away, showing a first embodiment of the invention.
FIG. 2 is a top plan view.

As shown in FIGS. 1, 2, and 3 the canting machine comprises an infeed section A, and outfeed section B and a log slabbing chipper section C. In FIG. 1 the infeed section A moves the log L lengthwise from right to left in the direction of arrow 9 to pass the log between a pair or rotary vertical chipper heads 10 and 11 which slab off outer portions on opposite sides of the log to form a cant with vertical faces on its opposite sides. Outfeed section B feeds the cant to the left out of the machine. Chipper section C is mounted on a stationary base frame 12. In the chipper section chipper head 10 is mounted on a slide 13 which may be reciprocated in frame 12 horizontally transversely of the log by a piston rod 14 which may be controlled by an electronic setting device. Slide 13 also carries a motor 15 with a belt drive 16 to rotate chipper head 10 on a horizontal axis transverse to the log. The opposite chipper head 11 on frame 12 is similarly mounted and driven.

During its passage through chipper section C and outfeed section B the log, and the resulting cant, slides on a horizontal support bar 20. The opposite vertical faces of the cant produced by cutter heads 10 and 11 are engaged by vertical guide plates 21 and pairs of vertical feed rolls 22. These parts are carried by frames 23 mounted on the slides 13 so as to move with chipper heads 10 and 11 when the slides 13 are adjusted by piston rods 14.

Rolls 22 are driven by hydraulic motors 24 and are mounted on arms 25 to pivot on a vertical shaft at 26 in each frame 23. Each roll is pressed against the vertical face of the cant by a pneumatic diaphragm unit 27. Rolls 22 drive the cant at the same linear speed that is imparted to the log in infeed section A.

As the leading end of an oncoming log approaches support rail 20 it engages a vertical knife edge guide wheel 30 which projects slightly above the level of rail 20. Guide wheel 30 indents itself in the underside of the log and forms its own track in the log. Guide wheel 30 is an idler wheel mounted on a stationary shaft 31.

The log is pressed down against guide wheel 30 by a knife edge press wheel 32 which indents itself into the top surface of the log. Wheels 30 and 32 resist the differential torque exerted on the log as a result of unequal chipping action by the two chipper heads 10 and 11 until the leading end of the log is additionally stabilized by guide plates 21 and rollers 22.

Press wheel 32 may be made as a sprocket, a circular disc or a notched disc. There may be a plurality of wheels 30 and 32 spaced apart axially to satisfy the requirements of the log positions, the primary purpose of these wheels being to resist a possible tendency of the oncoming log to rotate.

Press wheel 32 is mounted for rotation on the swinging end of an arm 33 which is pivotly mounted at 34 on a stationary frame 35. Wheel 32 is driven by chains 36, 37, and 38 from a motor 40. Wheel 32 is pressed against the log by the action of a pneumatic cylinder 41 having a piston rod 42 connected with arm 33. FIG. 5 shows a single wheel 30 and a single wheel 32 disposed in a common vertical plane P.

Infeed section A may be loaded from either side as indicated by arrows 45 in FIG. 2. The infeed section comprises an elongated frame 46 having a drive sprocket 50 at one end driven by the chain 38 and an idler sprocket 51 at its opposite end. An endless chain 52 on the sprockets 50 and 51 is connected to a plurality of pairs of saddle carriages such as the pair S1, S2 and the pair S3, S4. The carriages S2, S3 may also be used as a pair and the carriages S4, S1 may be used as a pair.

Instead of the single chain 52 operating on the center line, there may be a pair of such chains, one on each side of the infeed section.

The carriages in each pair are spaced different distances apart to provide two point support at appropriate supporting points for logs of different length so that the machine will readily handle random length logs by selecting a suitable pair of carriages to receive each oncoming log.

As shown in FIG. 3, each carriage has a V-shaped knife edge support 53 which may be referred to as a saddle or chair to support one end of the log. The opposite sides of the V make equal angles with the horizontal whereby the leading carriage S1 centers the small end of the log on this carriage and the trailing carriage S2 centers the large end of the log on that carriage, the knife edges exerting traction on the log to propel the log through chipper section C and into outfeed section B. Circle L1 indicates the position of a small log and circle L2 indicates the position of a large log in the saddle. The underside of each carriage is equipped with a bracket 54 connected with the chain 52.

Each carriage is supported on one side by a pair of grooved wheels 55 which ride on a track bar 56 and is supported on its opposite side by a pair of cylindrical rollers 57 which ride on a track bar 58 on the frame 46. The carriages pass around end sprockets 50 and 51 to return on lower track bars 59. Instead of using wheels and rollers, the carriages may be fitted with shoes or smooth surfaces to slide on a suitable rail material.

The length of infeed section A is sufficient to accommodate the longest logs to be handled and to accommodate the desired number of combinations of saddle carriages at different spacings to suit the range of log lengths to be handled. In FIG. 1 the carriage spacing referred to is indicated by the dimension line 60.

In loading a log onto the saddles or chairs 53 a carriage spacing is selected which will impart maximum stability to the log. If a log does not settle itself into leading and trailing saddles 53 in a stable position an auxiliary log turning device may be employed to turn it to a stable position. Stability is facilitated by never placing more than two carriages under a log regardless of the length of the log.

The loading machanism at 45 places the leading small end of each log on a log line 61 at a predetermined distance ahead of guide wheel 30 and the saddle 53 on the leading carriage is placed in a loading position on line 62 which is a fixed distance from line 61 regardless of the length of the log, as indicated by the dimension 63. This length of overhang insures that the leading end of the log will be engaged by guide wheel 30 and driven press wheel 32 before the leading saddle 53 loses contact with the log as saddle carriage S1 passes down around sprocket wheel 50.

Guide wheel 30 lifts the log sufficiently to free carriage S1 when the carriage reaches sprocket wheel 50. Then the log is propelled by press wheel 32 and trailing carriage S2. When the leading end of the log reaches outfeed section B, it is additionally propelled by driven rollers 22. In a similar manner the trailing end of the log is lifted off its carriage S2 by guide wheel 30 as carriage S2 approaches sprocket wheel 50.

After slabbing off two vertical faces on the log as hereinabove described, the operator may wish to pass the log through the machine a second time to square off the top and bottom sides and make a rectangular cant. This may readily be done in the present machine by making the saddle adjustable so that the lower portion of each side 53 of the saddle in FIG. 3 will move up to horizontal position to provide a horizontal saddle bar on the carriage. Then when one of the flat vertical faces is turned downward a second passage of the cant through chipper heads 10 and 11 will slab off the two remaining sides to make a rectangular cant.

In order to avoid scoring the down-turned smooth surface of the cant by guide wheel 30 in the second passage of the cant, a pair of rolls or wheels having the same diameter as the guide wheel 30 may be mounted on shaft 31 spaced a short distance on opposite sides of the guide wheel 30 to support the cant. The flat bottom surface of the cant does not require the guiding ability of the guide wheel and the guide wheel is still effective to indent and guide the round undersurface of other logs which protrude downward into the space between the rollers. The shaft of press wheel 32 may be equipped with similar rolls to prevent scoring the smooth upper surface. With the use of multiple guide wheels the flat surfaces of the cant are engaged by a number of wheels, thereby reducing the pressure sufficiently on each wheel to avoid objectionable indentation of the cant surface.

In the embodiment just described in connection with FIG. 3, half of the taper is removed from each of the two opposite sides of the log in symmetrical pattern by chipper heads 10 and 11. With two V-shaped saddles as shown in FIG. 6, the full taper is presented on one side and may be removed from only half the log length in some cases. Similarly shaped saddles with provision for bringing the bottom of the log into a horizontal plane would permit a bottom chipper head to slab the log full length while presenting the full taper on the top for slabbing as described.

The saddle in FIG. 6 has a vertical knife edge side 70 and an inclined knife edge side 71 shifting the center line of the log to a plane at an intermediate angle as indicated by the line 72. Circle L1 indicates the position of a small log and circle L2 indicates the position of a large log in the saddle.

The log thus moves through the chipper heads 10 and 11 in a direction parallel with the right side of the log in FIG. 6 rather than in a direction parallel with the center line of the log whereby the depth of cut on the right side of the log is uniform throughout the length of the log and all the taper is removed from the left side throughout as much of the log length as desired. In the choice of saddle shapes the operator must be governed chiefly by the shape of each individual log since relatively few logs at the present time are straight, true and symmetrical.

The FIG. 6 type of saddle requires a plurality of disc wheels 30 and 32, three wheels 32 being shown, in order to engage the log approximately directly under and above its center when the center line of the log is not parallel with the direction of travel.

Slabbing of all four sides can be done in a machine similar to the present machine with the use of similar saddles and saddle carriage spacing and it is not intended to limit the feed arrangement to the slabbing of only two surfaces.

The chain 52 may be equipped with all the saddles of the FIG. 3 shape, all of the FIG. 6 shape, or pairs of each shape, or saddles of other shapes and mechanisms to suit the many sawing patterns employed in the sawing of cants.

Further versatility of the machine is illustrated in FIG. 7. In this modification the lines 75 represent the opposite sides of a saddle each inclined at 45° from horizontal to form an included angle of 90°. The chipper heads 10*a* and 11*a* are positioned at corresponding 45° angles to make a cant having two adjacent flat sides in right angle relation. In this case guide plates 21 and outfeed rolls 22 are parallel with lines 75.

FIG. 8 shows a different arrangement for varying the spacing between a pair of saddle carriages according to the length of the log. In this modification a rear saddle carriage $S_R$ is connected by bracket 54 to an endless chain 80 driven by a sprocket wheel 81 on a shaft 82. A leading saddle carriage $S_L$ is connected by its bracket 54 to a second endless chain 83 alongside the chain 80. Chain 83 is driven by a sprocket wheel 84 which is connected to shaft 82 through a clutch 85. Clutch 85 may be engaged and disengaged by a manual lever 86 or by remote control power operated means. Relative positions of the saddles may be sensed by a differential feed back mechanism.

In the operation of the arrangement in FIG. 8, clutch 85 is engaged to position leading saddle carriage $S_L$ on the loading position line 62 in FIG. 1. Then the clutch is disengaged and motor 40 is operated to move trailing saddle carriage $S_R$ in opposite directions while carriage $S_L$ is stationary. Then, to feed the log, the clutch is reengaged and the two carriages move in unison. With this arrangement only two carriages are necessary to accommodate all lengths of logs. However, additional carriages may be used to provide the choice of saddle shapes shown in FIGS. 3, 6 and 7.

If it is desired to provide two chains to propel each carriage, then four chains would be necessary in FIG. 8, two chains being connected to carriage $S_L$ and two chains being connected to carriage $S_R$. Two of the chains would travel adjacent to track bar 56 and the other two would travel adjacent to track bar 58.

Having now described my invention and in what manner the same may be used, what I claim as new and desire to protect by Letters Patent is:

1. In a canting machine having an infeed section arranged to feed a log lengthwise past at least one chipper head to slab a flat side on a lateral side of the log and an outfeed section for feeding the slabbed log away from said chipper head; means to provide two points of support spaced different distances apart in said infeed section for logs of different lengths, said means comprising a saddle carriage to support the leading end of the log and a saddle carriage to support the trailing end of the log with the log unsupported between said two carriages, said carriages allowing the log to rotate to stable position; a track for said carriages; endless chain means for moving said carriages toward said chipper head without rotational restraint on the log; and means adjacent the infeed side of said chipper head to restrain rotation of the log, said restraining means comprising a vertical knife edge guide wheel arranged to engage the underside of the log and lift the log off an approaching carriage, and a knife edge press wheel arranged to engage the upper side of the log above said guide wheel.

2. A machine as defined in claim 1, including a longitudinal support rail arranged to support the underside of the log behind said guide wheel.

3. A canting machine as defined in claim 1, said endless chain means comprising an endless chain having pairs of said saddle carriages connected thereto at different distances apart.

4. A canting machine as defined in claim 1, said endless chain means comprising a pair of endless chains in side-by-side relation, said saddle carriage for the leading end of the log being connected to one of said chains, said saddle carriage for the trailing end of the log being connected to the other chain, and differential drive means for said chains to vary the spacing between said carriages.

5. A canting machine as defined in claim 1, each saddle carriage having a knife edge V-shaped saddle thereon to support the log.

6. A canting machine as defined in claim 5, said V-shaped saddle having opposite side portions inclined at equal angles from horizontal for aligning a log for passage between a pair of vertical chipper heads on opposite sides of the log.

7. A canting machine as defined in claim 5, said V-shaped saddle having one side portion vertical and an opposite side portion inclined from vertical position.

8. A canting machine as defined in claim 5, said V-shaped saddle having opposite side portions inclined at 45°, and a pair of chipper heads inclined at corresponding angles to form a cant having two adjacent faces at right angles to each other.

9. A canting machine as defined in claim 1 including a pair of said chipper heads on opposite sides of the machine, said outfeed section comprising guide plates and powered rolls in the planes of said chipper heads.

10. A canting machine as defined in claim 1 including a pair of chipper heads inclined at 45° from horizontal to form a cant having two adjacent sides in right angle relation.

* * * * *